US011970618B2

(12) United States Patent
Sandstrom et al.

(10) Patent No.: US 11,970,618 B2
(45) Date of Patent: Apr. 30, 2024

(54) RUBBER TIRE COMPOUND CONTAINING IPN-PROMOTING RESIN

(71) Applicant: The Goodyear Tire & Rubber Company, Akron, OH (US)

(72) Inventors: Paul Harry Sandstrom, Cuyahoga Falls, OH (US); Kelsey Elizabeth Cantwell, Akron, OH (US); Seth Cody Ensign, Springfield, IL (US); Nihat Ali Isitman, Hudson, OH (US)

(73) Assignee: THE GOODYEAR TIRE & RUBBER COMPANY, Akron, OH (US)

(*) Notice: Subject to any disclaimer, the term of this patent is extended or adjusted under 35 U.S.C. 154(b) by 358 days.

(21) Appl. No.: 17/381,305

(22) Filed: Jul. 21, 2021

(65) Prior Publication Data
US 2023/0044878 A1 Feb. 9, 2023

(51) Int. Cl.
| C08L 9/06 | (2006.01) |
|---|---|
| B60C 1/00 | (2006.01) |
| C08F 136/08 | (2006.01) |
| C08F 212/08 | (2006.01) |
| C08F 222/06 | (2006.01) |
| C08J 3/00 | (2006.01) |
| C08K 3/22 | (2006.01) |
| C08K 3/36 | (2006.01) |
| C08K 5/548 | (2006.01) |
| C08L 7/00 | (2006.01) |

(52) U.S. Cl.
CPC .............. *C08L 9/06* (2013.01); *B60C 1/0016* (2013.01); *C08F 136/08* (2013.01); *C08F 212/08* (2013.01); *C08F 222/06* (2013.01); *C08J 3/005* (2013.01); *C08K 3/22* (2013.01); *C08K 3/36* (2013.01); *C08K 5/548* (2013.01); *C08L 7/00* (2013.01); *C08K 2003/2296* (2013.01); *C08L 2205/03* (2013.01); *C08L 2205/04* (2013.01)

(58) Field of Classification Search
CPC .... C08L 9/06; C08L 7/00; C08K 3/22; C08K 3/36; C08K 5/548; B60C 1/00; C08J 3/00
USPC .......................................................... 523/156
See application file for complete search history.

(56) References Cited

U.S. PATENT DOCUMENTS

| | | | |
|---|---|---|---|
| 3,929,737 A | 12/1975 | Tazuma et al. | |
| 4,474,926 A | 10/1984 | Burroway | |
| 4,868,259 A | 9/1989 | Burroway et al. | |
| 5,191,024 A | 3/1993 | Shibata et al. | |
| 5,216,074 A | 6/1993 | Imai et al. | |
| 5,536,774 A * | 7/1996 | Segatta | C08L 21/00 524/505 |
| 5,684,082 A | 11/1997 | Segatta | |
| 5,864,082 A | 1/1999 | Hirano | |
| 6,207,763 B1 | 3/2001 | Wang et al. | |
| 6,639,166 B1 | 10/2003 | Welker et al. | |
| 8,613,298 B2 | 12/2013 | Kaszas | |
| 10,150,336 B2 | 12/2018 | Brace et al. | |
| 2010/0139128 A1 | 6/2010 | Wilson | |
| 2011/0136969 A1* | 6/2011 | Hahn | C08K 5/47 524/572 |
| 2013/0035434 A1 | 2/2013 | Wilson, III | |
| 2014/0194567 A1 | 7/2014 | Narayan | |

FOREIGN PATENT DOCUMENTS

| JP | 2010132012 A | 6/2010 |
|---|---|---|
| JP | 2012201742 A | 10/2012 |

OTHER PUBLICATIONS

European Search Report for Serial No. EP22184515 dated Dec. 14, 2023.

* cited by examiner

*Primary Examiner* — Deve V Hall
(74) *Attorney, Agent, or Firm* — Mandy B. Willis

(57) ABSTRACT

A vulcanizable rubber composition comprises an interpenetrating or ionic network (IPN)-promoting resin. The resin comprises side chain functional groups along the resin backbone, which, in the presence of an additive material, form the connections that make up the IPN. In one embodiment, such material is ZnO. A method for forming the rubber composition comprises, in a productive step, mixing the product of the non-productive step, the zinc oxide, and a resin derived from maleic anhydride. The zinc oxide and the resin are simultaneously added to the composition during the productive mixing stage. The rubber composition can be cured and incorporated in a tire component, such as, a tread.

11 Claims, No Drawings

RUBBER TIRE COMPOUND CONTAINING IPN-PROMOTING RESIN

FIELD OF THE INVENTION

The present exemplary embodiments relate to a composition, method and system for promoting an interpenetrating or ionic network (IPN) in a rubber tire compound. It finds particular application in conjunction with tire treads and will be described with particular reference thereto. However, it is to be appreciated that the present exemplary embodiments are also amenable to other like applications.

BACKGROUND OF THE INVENTION

Tires are sometimes desired to have treads that promote traction on dry surfaces. Various rubber compositions have been proposed in which specific traction resins or additives are used to attain dry traction. To meet the challenge of providing a tread rubber composition having improved dry traction, it is desired to evaluate a specialized traction resin(s) that can form an interpenetrating or ionic network (IPN) in the rubber compound.

In situ formed resins have been observed to enhance adhesion between rubber compounds and a reinforcing material, such as steel wires, used in a tire. In conventional practice, the resin is formed in situ during vulcanization of the rubber, thus creating a bond between the reinforcing material and the rubber. By reacting with a methylene acceptor, maleic anhydride functionalized triblock copolymer is one example known to generate a resin in situ. However, its use has been limited to conventional textile fiber or reinforcing cords. Herein, a compound is introduced in which the side chain functional groups, along the backbone of a resin derived from maleic anhydride, can be used to promote the IPN. Furthermore, it is desired to evaluate conditions in which additive materials can be used to promote a connection of the functional groups with each other.

SUMMARY OF THE INVENTION

One embodiment of the disclosure is directed to a vulcanizable rubber composition comprising, based on 100 parts per weight (phr) of elastomer:
- (A) elastomers selected from the group consisting of styrene-butadiene; polybutadiene; natural rubber; polyisoprene; and mixtures thereof;
- (B) from about 5 to about 15 phr of a resin comprising side chain functional groups along the resin backbone; and
- (C) from 1 to about 5 phr of a processing additive capable of promoting connections between the functional groups to form an interpenetrating or ionic network.

One embodiment of the disclosure is directed to a tire component incorporating the rubber composition.

Another embodiment of the disclosure is directed to a method of preparing a rubber composition, based on 100 parts per weight (phr) of elastomer, comprising:
- (A) mixing in at least one preliminary non-productive mixing step in the absence of a sulfur curative 100 phr of diene-based elastomers and a reinforcement filler; followed by
- (B) mixing with a product of the non-productive mixing step in a final productive mixing step zinc oxide and a resin from maleic anhydride, wherein the zinc oxide and the resin are simultaneously added to the product of the non-productive mixing step.

A further embodiment of the disclosure is directed to a method of forming an ionic network within a rubber composition. In a productive mixing step, the method comprises the step of mixing within a non-productive compound, produced from a preliminary non-productive step, a resin comprising side chain functional groups along the resin backbone. Zinc oxide is simultaneously added to the composition with the resin. It is believed that the zinc oxide promotes the functional groups to connect with each other and form an interpenetrating or ionic network.

In one embodiment, a tire component is formed from such method.

DETAILED DESCRIPTION OF THE INVENTION

The present disclosure is directed to a vulcanizable rubber composition, which comprises an interpenetrating or ionic network (IPN)-promoting resin. In one embodiment, the resin is functionalized. In the presence of a processing additive, the functional groups form the connections that make up the IPN.

More specifically, the present disclosure is directed to a vulcanizable rubber composition comprising, based on 100 parts per weight (phr) of elastomer:
- (A) elastomers selected from the group consisting of styrene-butadiene; polybutadiene; natural rubber; polyisoprene; and mixtures thereof;
- (B) from about 5 to about 15 phr of a resin comprising side chain functional groups along the resin backbone; and
- (C) from 1 to about 5 phr of a processing additive capable of promoting connections between the functional groups to form an interpenetrating or ionic network.

As used herein, an "interpenetrating" or "ionic network" (IPN) is a material containing two or more polymers that have been vulcanized (crosslinked) in the presence of each other to form entangled networks with each other.

As used herein, except where context requires otherwise, the term "comprise" and variations of the term, such as "comprising", "comprises" and "comprised", are not intended to exclude further additives, components, integers, or steps.

As used herein, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art.

Rubber Elastomers

The disclosed rubber composition comprises at least one diene-based elastomer. In practice, various conjugated diene-based elastomers may be used for the rubber composition such as, for example, polymers and copolymers of at least one of isoprene and 1,3-butadiene and of styrene copolymerized with at least one of isoprene and 1,3-butadiene, and mixtures thereof.

Representative of such conjugated diene-based elastomers are, for example, comprised of at least one of cis 1,4-polyisoprene (natural and synthetic), cis 1,4-polybutadiene, styrene butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers.

The cis 1,4-polyisoprene and cis 1,4-polyisoprene natural rubber are well known to those having skill in the rubber art.

Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile, which polymerize with butadiene to form NBR, methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether.

Specific examples of synthetic rubbers include neoprene (polychloroprene), polybutadiene (including cis-1,4-polybutadiene), polyisoprene (including cis-1,4polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers.

In practice, the preferred rubber or elastomers are polyisoprene (natural or synthetic), polybutadiene and SBR. In one embodiment, one elastomer is an SBR and, more preferably, a solution-polymerized SBR (SSBR). The SSBR can be conveniently prepared, for example, by organo lithium catalyzation in the presence of an organic hydrocarbon solvent.

In one embodiment, at least one elastomer is functionalized to react with a silica filler. Representative of functionalized elastomers are, for example, styrene/butadiene elastomers containing one or more functional groups comprised of (A) amine functional group reactive with hydroxyl groups on precipitated silica, (B) siloxy functional group, including end chain siloxy groups, reactive with hydroxyl groups on precipitated silica, (C) combination of amine and siloxy functional groups reactive with hydroxyl groups on said precipitated silica, (D) combination of thiol and siloxy (e.g. ethoxysilane) functional groups reactive with hydroxyl groups on the precipitated silica, (E) combination of imine and siloxy functional groups reactive with hydroxyl groups on the precipitated silica, (F) hydroxyl functional groups reactive with the precipitated silica.

For the functionalized elastomers, representatives of amine functionalized SBR elastomers are, for example, in-chain functionalized SBR elastomers mentioned in U.S. Pat. No. 6,936,669, the disclosure of which is incorporated herein in its entirety.

Representative of a combination of amino-siloxy functionalized SBR elastomers with one or more amino-siloxy groups connected to the elastomer is, for example, HPR355™ from JSR and amino-siloxy functionalized SBR elastomers mentioned in U.S. Pat. No. 7,981,966, the disclosure of which is incorporated herein in its entirety.

Representative styrene/butadiene elastomers end functionalized with a silane-sulfide group are, for example, mentioned in U.S. Pat. Nos. 8,217,103 and 8,569,409, the disclosures of which are incorporated herein in their entirety.

Organic solvent polymerization prepared tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers including the aforesaid functionalized styrene/butadiene elastomers.

Tin coupled copolymers of styrene/butadiene may be prepared, for example, by introducing a tin coupling agent during the styrene/1,3-butadiene monomer copolymerization reaction in an organic solvent solution, usually at or near the end of the polymerization reaction. Such coupling of styrene/butadiene copolymers is well known to those having skill in such art.

In practice, it is usually preferred that at least 50 percent and more generally in a range of about 60 to about 85 percent of the Sn (tin) bonds in the tin coupled elastomers are bonded to butadiene units of the styrene/butadiene copolymer to create Sn-dienyl bonds such as butadienyl bonds.

Creation of tin-dienyl bonds can be accomplished in a number of ways such as, for example, sequential addition of butadiene to the copolymerization system or use of modifiers to alter the styrene and/or butadiene reactivity ratios for the copolymerization. It is believed that such techniques, whether used with a batch or a continuous copolymerization system, is well known to those having skill in such art.

Various tin compounds, particularly organo tin compounds, may be used for the coupling of the elastomer. Representative of such compounds are, for example, alkyl tin trichloride, dialkyl tin dichloride, yielding variants of a tin coupled styrene/butadiene copolymer elastomer, although a trialkyl tin monochloride might be used which would yield simply a tin-terminated copolymer.

Examples of tin-modified, or coupled, styrene/butadiene copolymer elastomers might be found, for example and not intended to be limiting, in U.S. Pat. No. 5,064,901, the disclosure of which is incorporated herein in its entirety.

Emulsion polymerization prepared styrene/butadiene/acrylonitrile copolymer rubbers containing about 2 to about 40 weight percent bound acrylonitrile in the copolymer are also contemplated as diene-based rubbers for use in this invention.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

It is further contemplated that, in certain embodiments, the rubber elastomer may be a butyl type rubber, particularly copolymers of isobutylene with a minor content of diene hydrocarbon(s), such as, for example, isoprene and halogenated butyl rubber.

In one embodiment, the rubber composition may comprise from 0 to about 100 phr of a first rubber elastomer and, more preferably, from about 10 to about 90 phr of the first elastomer in a composition comprising at least two elastomers. In one embodiment, an additional diene-based elastomer is employed such that the composition comprises the combination of at least two elastomers (synthetic and/or natural). For example, the additional conjugated diene-based elastomer may also be present in the rubber composition in the amount of from about 1 to about 100 phr and, more specifically, from about 10 to about 90 phr. In one embodiment, at least a third rubber elastomer may be employed. In one embodiment, the first and second, and optional additional elastomers, are provided in amounts that total 100 phr.

In one embodiment, the majority elastomer by parts by weight may comprise a styrene-butadiene rubber and the additional elastomer may comprise a polybutadiene. In practice the disclosed rubber composition can include mixtures of elastomers comprising at least an SBR and a polybutadiene and, more specifically, a functionalized SBR and/or functionalized polybutadiene.

Resin

The disclosed rubber composition further comprises from 1 to about 20 phr of a resin and, more specifically, from about 5 to about 15 phr of a functionalized resin. In practice, the resin is characterized by side chain functional groups along the resin backbone, which may have been modified in contemplated embodiments with maleic anhydride. In a preferred embodiment, the resin is from maleic anhydride, such as styrene-maleic anhydride.

A resin from maleic anhydride can be produced by Goodyear using emulsion free radical polymerization of styrene, alpha methyl styrene or t-butyl styrene in combination with methacrylic acid, itaconic acid, hydroxyl ethyl methacrylate, hydroxyl propyl methacrylate or glycidyl methacrylate. One process for forming such resin is described by Goodyear in U.S. Pat. No. 4,474,926, the disclosure of which is incorporated herein by reference in its entirety. Maleic anhydride has provided a modified resin capable of being incorporated directly into a rubbery polymer as a tackifier in U.S. Pat. No. 3,929,737, also to Goodyear, the disclosure of which is hereby incorporated by reference. Another process for preparing a polymeric resin which contains repeat units which are derived from maleic anhydride in an emulsion polymerization process is disclosed in U.S. Pat. No. 4,868,259, also to Goodyear, the disclosure of which is hereby incorporated by reference.

In practice, the desired resin has an average molecular weight that ranges from about 5 to about 30,000 g/mol and, more specifically for certain embodiments, from about 2,000 to 20,000 g/mol.

The desired resin typically has a glass transition temperature (Tg) ranging from about +60° C. to about 140° C. and, more preferably, from about 90° C. to about 110° C. In one embodiment, the Tg is above 100° C. In another embodiment, the Tg is below 110° C. Additionally, the desired resin is typically characterized by low molecular weight with an approximately 8:1 mole ratio.

Embodiments are further contemplated in which an alternative resin, similarly characterized, can be employed in the rubber composition. Such resins may possess, by example only, excellent electrical properties similar to SMA, such as, for example, a well-defined reactivity, high purity, and/or low metal ion- and chloride content. In other embodiments, two or more resins can be employed for providing such properties.

The functional groups introduced along the side chain of these resins can be connected with each other by various added materials to form an interpenetrating network or IPN. Materials of similar structure can also be obtained commercially. A styrene-maleic anhydride copolymer resin that is suitable for use in practice of this invention is available, for instance, as SMA® EF80 by Cray Valley.

Processing Additive—Zinc Oxide

A critical aspect of the present disclosure is the addition of zinc oxide. In the contemplated embodiment, the zinc oxide is added to the productive mix stage. In such embodiment, negligible to no zinc oxide should be added or present during the non-productive stage of mixing. Generally, from about 0.5 to about 4 phr and, more preferably, from about 1 to about 3 phr of zinc oxide may be added or present during the production stage of mixing.

Other embodiments are contemplated in which an alternative or additional additive can be added to the rubber composition for promoting the interpreting or ionic network between the functional groups along the side chain of the resin.

Oil

The rubber composition may optionally include rubber processing oil. The rubber composition can include from 0 to about 60 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. In one embodiment, the rubber composition includes a low PCA oil. Suitable low PCA oils include but are not limited to mild extraction solvates (MES), treated distillate aromatic extracts (TDAE), residual aromatic extract (RAE), SRAE, and heavy napthenic oils as are known in the art; see, for example, U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917, the disclosures of which are hereby incorporated by reference.

Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

Suitable TDAE oils are available as Tudalen® SX500 from Klaus Dahleke KG, VivaTec® 400 and VivaTec® 500 from H&R Group, and Enerthene® 1849 from BP, and Extensoil® 1996 from Repsol. The oils may be available as the oil alone or along with an elastomer in the form of an extended elastomer.

Suitable vegetable oils include, for example, soybean oil, sunflower oil, rapeseed oil, and canola oil which are in the form of esters containing a certain degree of unsaturation.

Filler

The vulcanizable rubber composition may include a reinforcement filler, such as silica.

The silica filler may be any suitable silica or a combination of any such silica. Commonly used siliceous pigments that are used in rubber compounding applications include pyrogenic and precipitated siliceous pigments (silica), as well as precipitated high surface area ("HSA") silica and highly dispersive silica ("HDS").

The conventional siliceous pigments preferably employed in this invention are precipitated silicas such as, for example, those obtained by the acidification of a soluble silicate, e.g., sodium silicate.

The precipitated silicas can be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930). The conventional silica may also be typically characterized by having a dibutylphthalate (DBP) absorption value in a range of about 100 to about 400, and more usually about 150 to about 300. The conventional silica might be expected to have an average ultimate particle size, for example, in the range of 0.01 to 0.05 micron as determined by the electron microscope, although the silica particles may be even smaller, or possibly larger, in size.

In one example, the silica is present in the rubber compound in an amount no less than about 50 phr. In another example, the silica is present in an amount of no more than 150 phr. In another example, the silica is present in an amount no more than about 100 phr. In yet another example, the silica may be present in an amount of from about 50 phr to about 150 phr. In yet another embodiment, the silica may be present in an amount of about 65 phr.

Various commercially available silicas may be used, such as, only for example herein, and without limitation, silicas commercially available from PPG Industries under the Hi-Sil trademark with designations 210, 243, 315 etc.; silicas available from Rhodia, with, for example, designations of Z1165MP, Z165GR, Zeosil Premium® 200MP and silicas available from Degussa AG with, for example, designations VN2 and VN3, etc.

When precipitated silica is a pre-hydrophobated precipitated silica, additional precipitated silica (non-pre-hydrophobated silica) and/or a coupling agent may optionally be added to the rubber composition.

Coupling Agent

In one embodiment, the rubber composition may include a silane coupling agent. In one embodiment, the rubber composition may comprise a silane coupling agent in response to the reinforcement filler being silica.

The silane coupling agent may be any suitable silane coupling agent, such as bis(ω-trialkoxyalkylsilyl) polysulfide, ω-mercaptoalkyl-trialkoxysilane, or combination thereof. In one example, the bis-(ω-trialkoxysilylalkyl) polysulfide has an average of from about 2 to about 4 connecting sulfur atoms in its polysulfidic bridge. In another example, the bis-(ω-trialkoxysilylalkyl) polysulfide has an average of from about 2 to about 2.6 connecting sulfur atoms in its polysuflidic bridge. In yet another example, the bis-(ω-trialkoxysilylalkyl)polysulfide has an average of from about 3.3 to about 3.8 connecting sulfur atoms in its polysulfidic bridge. The alkyl group of the silylalkyl moiety of the bis-(ω-trialkoxysilylalkyl)polysulfide may be a saturated $C_2$-$C_6$ alkyl group, e.g., a propyl group. In addition, at least one of the alkyl groups of the trialkoxy moiety of the bis-(ω-trialkoxysilylalkyl)polysulfide can be an ethyl group and the remaining alkyl groups of the trialkoxy moiety can be independently saturated $C_2$-$C_{18}$ alkyls. In another example, at least two of the alkyl groups of the trialkoxy moiety of the bis-(ω-trialkoxysilylalkyl) polysulfide are ethyl groups and the remaining alkyl group of the trialkoxy moiety is independently a saturated $C_3$-$C_{18}$ alkyl. In one example, the bis-(ω-trialkoxysilylalkyl) polysulfide coupling agent is bis-3-(triethoxysilylpropyl) tetrasulfide ("TESPD"). In another example, the bis-(ω-trialkoxysilylalkyl) Polysulfide coupling agent is bis-3-(triethoxysilylpropyl) tetrasulfide ("TESPT"). The ωmercaptoalkyltrialkoxysilane may have its mercapto moiety blocked from pre-reacting with hydroxyl groups (e.g., silanol groups) contained on the precipitated silica aggregates prior to unblocking the blocked mercapto moiety at an elevated temperature. In one example, the blocked w-mercaptoalkyl-trialkoxysilane is NXT or NXT-LoV available from GE Silicones of Tarrytown, N.Y.

The silane coupling agent is present in the rubber compound in an amount no greater than 15% by weight of silica. In another example, the silane coupling agent is present in an amount less than about 5% by weight of silica.

The silane coupling agent may present in an amount between from about 0 to about 20 phr and, more specifically, from about 5 to about 15 phr. The silane coupling agent may be present in the rubber compound in an amount no greater than 20 phr and, more specifically, 15 phr and, most specifically 10 phr in some embodiments. In another example, the silane coupling agent may be present in an amount no less than about 5 phr and, in certain embodiments, 1 phr.

Carbon Black and/or Additional Filler

Additional filler material, e.g., carbon black, and others well known to those having ordinary skill in the art may also be included in the rubber compound in the desired phr. Representative examples of such carbon blacks include N110, N121, N134, N220, N231, N234, N242, N293, N299, 5315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3$/100 g.

Other fillers that may be used in the rubber composition include, but are not limited to, particulate fillers such as ultra-high molecular weight polyethylene (UHMWPE), particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639, the disclosures of which are hereby incorporated by reference.

Sulfur Curative

It may be preferred to have the rubber composition for use in the tire component to additionally contain a conventional sulfur containing organosilicon compound. Examples of suitable sulfur containing organosilicon compounds are of the formula:

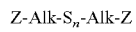

in which Z is selected from the group consisting of

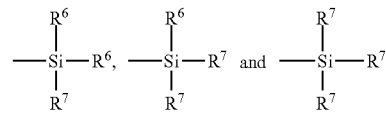

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxysilyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"'-methylcyclohexoxysilylethyl) tetrasulfide, bis(trimethoxysilylmethyl) tetrasulfide, 3-methoxyethoxypropoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyliso-propoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxysilylpropyl) sulfides. The most preferred compounds are 3,3'-bis(triethoxysilylpropyl) disulfide and 3,3'-bis(triethoxysilylpropyl) tetrasulfide. Therefore, as to formula I, preferably Z is

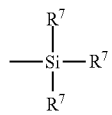

where $R^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials.

In another embodiment, suitable sulfur containing organosilicon compounds include compounds disclosed in U.S. Publication 2006/0041063, the disclosure of which is incorporated herein by reference in its entirety. In one embodiment, the sulfur containing organosilicon compounds include the reaction product of hydrocarbon based diol (e.g., 2-methyl-1,3-propanediol) with S-[3-(triethoxysilyl)propyl] thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535, which is incorporated herein by reference in its entirety. In one embodiment, the sulfur containing organosilicon compound is Si-363 from Degussa.

The amount of the sulfur containing organosilicon compound of formula I in a rubber composition will vary depending on the level of other additives that are used. The amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1 to 6 phr being preferred. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 6, preferably about 0.8 to about 4, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Now described is a method of preparing a rubber composition, based on 100 parts per weight (phr) of elastomer. In a non-productive mix stage, the diene-based elastomers and a reinforcement filler are mixed together in the absence of a sulfur curative. The elastomers can be combined or separately mixed into one or more non-productive compounds. This is followed by a productive mix stage in which the functionalized resin, such as the resin derived from maleic anhydride discussed supra, and a processing additive, such as the zinc oxide discussed supra, are simultaneously added to the non-productive compound for curing. In the preferred embodiment, zinc oxide is excluded in the non-productive stage and is absent in the product (e.g., the non-productive compound) of the non-productive stage.

In the preferred embodiment, a non-productive compound is a product of a preliminary non-productive step but the resin and the ZnO are simultaneously added to the non-productive compound in a productive step. While the functionalized resin and ZnO are simultaneously mixed in the productive stage, embodiments are contemplated in which the ingredients can be sequentially added to the rubber composition in different stages. For example, in one embodiment the ZnO can be added to the mixture in a preliminary, non-productive stage and the resin can be added to the mixture in a final, productive stage.

The disclosure contemplates a tire component formed from such method. Similarly, the tire component may be incorporated in a tire. The tire component can be ground contacting or non-ground contacting. The tire can be pneumatic or non-pneumatic. In one embodiment, the tire component can be a tread.

The tire of the present invention may be a race tire, passenger tire, aircraft tire, agricultural, earthmover, off-the-road, truck tire, and the like. Preferably, the tire is a passenger or truck tire. The tire may also be a radial or bias, with a radial being preferred.

Vulcanization of a pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

Example 1

In this example, the effects on the performance of rubber compounds are illustrated for compounds in which an ionic network is formed by dispersing ZnO in a mixture including styrene-maleic anhydride copolymer resin.

A control rubber compound was prepared as Sample C1 excluding the styrene-maleic anhydride resin. The compound of Sample C1 comprised zinc oxide, which was mixed into the composition during the productive mix stage.

An experimental rubber compound was prepared as Sample E1 using the styrene-maleic anhydride resin but excluding the zinc oxide, with all other ingredients being the same.

An experimental rubber compound was prepared as Sample E2 using both the styrene-maleic anhydride resin and zinc oxide, with all other ingredients being the same. The SMA resin and the ZnO were mixed in two stages. Namely, the ZnO was mixed in the non-productive stage and the SMA resin was mixed in the productive stage.

An experimental rubber compound was prepared as Sample E3 using both the styrene-maleic anhydride resin and zinc oxide, with all other ingredients being the same. The SMA resin and the ZnO were simultaneously mixed in the same stage. Namely, both ingredients were mixed in the productive stage.

The basic formulations are illustrated in the following Table 1, which is presented in parts per 100 parts by weight of elastomers (phr).

TABLE 1

| | Samples | | | |
| --- | --- | --- | --- | --- |
| | Control | Experimental | | |
| | C1 | E1 | E2 | E3 |
| Functionalized SSBR (Tg −23° C.) | 60 | 60 | 60 | 60 |
| High-cis polybutadiene | 40 | 40 | 40 | 40 |
| Precipitated silica (160 m$^2$/g) | 90 | 90 | 90 | 90 |
| Silane coupling agent Si266 | 9 | 9 | 9 | 9 |
| Process oil (petroleum based) | 37.5 | 37.5 | 37.5 | 37.5 |
| Accelerators | 3.75 | 3.75 | 3.75 | 3.75 |
| Stearic acid | 5 | 5 | 5 | 5 |
| Waxes | 1.5 | 1.5 | 1.5 | 1.5 |
| Antidegradants | 3.25 | 3.25 | 3.25 | 3.25 |
| Zinc oxide | | | | |
| In non-productive stage | 0 | 0 | 1.75 | 0 |
| In productive stage | 1.75 | 0 | 0 | 1.75 |
| Sulfur | 1.3 | 1.3 | 1.3 | 1.3 |
| Styrene-maleic anhydride resin[1] | 0 | 10 | 10 | 10 |

[1]Obtained as SMA EF80 from Total Cray Valley with an S/MA ration of 8 and Tg of about 104° C.

The results in Table 2 compare the cured properties of Control Sample C1 and Experimental Samples E1-E3.

TABLE 2

| | Samples | | | |
|---|---|---|---|---|
| | Control | Experimental | | |
| | C1 | E1 | E2 | E3 |
| Zinc oxide | | | | |
| In non-productive stage | 0 | 0 | 1.75 | 0 |
| In productive stage | 1.75 | 0 | 0 | 1.75 |
| Styrene-maleic anhydride resin | 0 | 10 | 10 | 10 |
| Uncured property | | | | |
| G' at 15% strain, 100° C. (MPa) (lower is better) | 0.18 | 0.19 | 0.18 | 0.21 |
| Tensile properties | | | | |
| Modulus 300% (MPa) | 10.5 | 6.8 | 7.7 | 8.6 |
| Tensile Strength (MPa) | 15.8 | 14.8 | 15 | 16 |
| Elongation (%) | 406 | 546 | 518 | 497 |
| Stiffness/Hardness | | | | |
| Shore A (higher is better) | 65 | 69 | 71 | 71 |
| Dynamic mechanical analysis | | | | |
| G' at 5% strain, 30° C. (MPa) | 2.7 | 4.6 | 5.6 | 5.5 |
| Tan D at 5% strain, 30° C. (higher is better) | 0.24 | 0.30 | 0.29 | 0.28 |

As can be seen in Table 2, overall performance properties of the experimental rubber compounds E1-E3 (formed using a resin derived from maleic anhydride—more specifically, SMA resin) compared favorably with the properties of Control Sample C1. The evaluation further evidenced that the desired improvement in dry grip is achieved by the disclosed compound.

When compared to Control Sample C1, a substantial increase in shore A hardness and an improvement in cured dynamic modulus G' (as a predictive of handling performance) are observed from the addition of the SMA resin in Control Sample E1. An increased hysteresis (as a predictor of improved dry traction) is also observed by a higher tan delta value.

The combination of SMA resin and ZnO in Experimental Samples E2 and E3 displays a further increase in shore A hardness over Control Sample C1 and Experimental Sample E1. The cured dynamic modulus G' of experimental Sample E2 is maintained with Control Sample C1 but has the highest value (indicative of an improvement over all other samples) associated with Experimental Sample E3. A higher Tan D value is indicative of beneficially improved dry grip, and Table 2 shows that it is substantially increased over Control Sample C1 and is maintained in Experimental Sample E2. The values representing tensile strength are comparable to Control Sample C1, and thus indicates that the tensile strength is maintained over the control. Elongation at break is also improved over the Control Sample C1.

Experimental Samples E1-E3 maintain the processability as evidenced by an uncured G' that is similar to Control C1.

It is therefore concluded that the simultaneous addition of a resin derived from maleic anhydride and ZnO in the productive stage improves predicted dry grip performance, as evidenced by the increased modulus and hysteresis. Furthermore, such improvements do not necessitate that a trade-off be accepted between the improved dry grip and tensile properties or processing characteristics (predicted by a similar uncured G' to control), which are maintained over Control Sample C1. This is indicative of a beneficial improvement in dry grip for a vehicle tire having a tread of such rubber composition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A vulcanizable rubber composition comprising, based on 100 parts per weight (phr) of elastomer:
   (A) elastomers selected from the group consisting of styrene-butadiene; polybutadiene; natural rubber; polyisoprene; and mixtures thereof;
   (B) from about 5 to about 15 phr of an olefin-maleic anhydride copolymer resin comprising side chain functional groups along the resin backbone and characterized by an MA; olefin mole ratio between from about 0.20 and about 8 and an average molecule weight between from about 5 and about 30,000 g/mol; and
   (C) from 1 to about 5 phr of a processing additive capable of promoting connections between the functional groups to form an interpenetrating or ionic network.

2. The rubber composition of claim 1, wherein the resin is derived from maleic anhydride.

3. The rubber composition of claim 1, wherein the resin is a styrene-maleic anhydride (SMA) copolymer resin.

4. The rubber composition of claim 3, wherein the SMA is characterized by an MA mole ration between from about 1 and about 8 and an average molecular weight between from about 2,000 and about 20,000 g/mol.

5. The rubber composition of claim 1, wherein the processing additive is zinc oxide.

6. The rubber composition of claim 5, wherein the resin and the ZnO are simultaneously added to a non-productive compound comprising the elastomers in a productive mix step, the non-productive compound being a product of a preliminary non-productive mix step.

7. The rubber composition of claim 1 further comprising from about 50 to 150 phr of at least one reinforcement filler; wherein in response to the reinforcement filler being silica, the composition further comprises from about 5 to about 15 phr of a coupling agent.

8. The rubber composition of claim 1, wherein the elastomers comprise:
   from about 10 to about 90 phr of the styrene-butadiene rubber; and
   from about 90 to about 10 phr of the polybutadiene rubber.

9. The rubber composition of claim 7, wherein at least one of the styrene-butadiene rubber and the polybutadiene rubber is functionalized.

10. A tire component incorporating the rubber composition of claim 1.

11. The tire component of claim 10, wherein the tire component is a tread.

* * * * *